United States Patent [19]
Choate et al.

[11] 3,725,875

[45] Apr. 3, 1973

[54] PROBABILITY SORT IN A STORAGE MINIMIZED OPTIMUM PROCESSOR

[75] Inventors: William C. Choate; Michael K. Masten, both of Dallas, Tex.

[73] Assignee: Texas Instruments Incorporated, Dallas, Tex.

[22] Filed: Jan. 14, 1972

[21] Appl. No.: 217,771

Related U.S. Application Data

[63] Continuation of Ser. No. 889,143, Dec. 30, 1969, abandoned.

[52] U.S. Cl. ....................340/172.5

[51] Int. Cl. ....................G06f 15/18

[58] Field of Search ....................340/146.3, 172.5

[56] References Cited

UNITED STATES PATENTS

| | | | |
|---|---|---|---|
| 3,191,150 | 6/1965 | Andrews | 340/146.3 |
| 3,209,328 | 9/1965 | Bonner | 340/146.3 |
| 3,235,844 | 2/1966 | White | 340/172.5 |
| 3,440,617 | 4/1969 | Lesti | 340/172.5 |
| 3,599,157 | 8/1971 | Choate | 340/172.5 |

*Primary Examiner*—Harvey E. Springborn
*Attorney*—Samuel M. Mims, Jr. et al.

[57] ABSTRACT

A trainable signal processor having at least one input signal $u$ and one desired output signal $z$ applied thereto during training and having at least one actual output signal derived therefrom during execution is provided. From each member of the input sequence $u(t_i)$ a key $K_i$ is generated. $K_i$ may have only a finite number of values and is a single valued function of $u$. Corresponding to each value of the $K_i$ generated during training, a trained response is derived from samples of the desired output signal $z$ measured at those instances $t_i$ at which that value of $K_i$ occurred. This operation is such that the contemporary value of the trained response is maintained in a tree allocated file. The file thereby associates with each key $K_i$ a trained response. Storage is provided for only those $K_i$ which actually occurred during training, which is an important attribute since these typically constitute a small fraction of those values which may theoretically occur, especially when the input is of multi-dimensional character. During execution the tree allocated file provides for efficient retrieval of the trained responses which are employed in determining the actual output signal of the processor.

Whereas the tree allocation can greatly reduce the storage relative to that of the storage-wise inefficient method of direct addressing, the speed of operation is less due to the need to perform a sequence of operations on components of the key. Disclosed herein is a means of greatly improving the speed of the tree allocated file while retaining its advantages.

The means involves control of the tree structure through a probability sorting operation which is effected periodically to arrange the nodes within the tree such that the modes of a filial set which are selected most frequently during training are placed near the entry node of the set. Specifically the node most likely to be selected is made the entry node of the set; it is chained to the node next most likely to be selected, etc., leaving the node least likely to be selected the terminal node of the set. This property holds for all sets of nodes within the tree.

6 Claims, 10 Drawing Figures

INVENTORS
WILLIAM C. CHOATE
MICHAEL K. MASTEN

ATTORNEY

PROBABILITY SORT IN A STORAGE MINIMIZED OPTIMUM PROCESSOR

This is a continuation, of application Ser. No. 889,143, now abandoned, filed Dec. 30, 1969

This invention relates to methods and systems for training optimal signal processors, and more particularly to the use of tree storage with high dynamic range quantization and node organization operations derived in dependence upon the frequency of node selection. By use of the term selection as applied to a given node, it is meant that the value of said node matches the corresponding key component during training operation.

A trainable processor is a device or system capable of receiving and digesting information in a training mode of operation and subsequently operating on additional information in an execution mode of operation in a manner learned in accordance with training.

The process of receiving information and digesting it constitute training. Training is accomplished by subjecting the processor to typical input signals together with the desired outputs or responses to these signals. The input/desired output signals used to train the processor are called training functions. During training the processor determines and stores cause-effect relationships between input and desired output. The cause-effection relationships determined during training are called trained responses.

The post training process of receiving additional information via input signals and operating on it in some desired manner to perform useful tasks is called execution. More explicity, for the processors considered herein, the purpose of execution is to produce from the input signal an output, called the actual output, which is the best, or optimal, estimate of the desired output signal. There are a number of useful criteria defining "optimal estimate." One is minimum mean squared error between desired and actual output signals. Another, useful in classification applications, is minimum probability of error.

Optimal, nonlinear processors may be of the type disclosed in Bose u.S. Pat. No. 3,265,870, which represents an application of the nonlinear theory discussed by Norbert Weiner in his work entitled Fourier Integral and Certain of Its Applications, 1933, Dover Publications, Inc., or of the type described in application Ser. No. 732,152, now U.S. Pat. No. 3,599,157, filed May 27, 1968, for "Feedback-Minimized Optimum Filters and Predictors."

Such processors have a wide variety of applications. In general, they are applicable to any problem in which the cause-effect relationship can be determined via training. While the present invention may be employed in connection with processors of the Bose type, the processor disclosed and claimed in said application Ser. No. 732,152 will be described forthwith to provide a setting for the description of the present invention.

The extent to which training must be extended in general may not be anticipated with certainty. Storage must be provided during training for unique sets of input signals encountered during training as well as trained responses for each set.

It has been discovered that the efficiency of storage and retrieval of trained responses compound be greatly enhanced by use of tree storage in a random access memory and selected quantization of the members of the signal set (keys), as disclosed in copending patent application Ser. No. 837,425, now abandoned, CTI-3495 filed June 30, 1969, for "Storage Minimized Optimum Processor." In tree storage an automatic trainable signal processing machine is provided where a set of input signals which are single valued functions of time, including at least one input signal $u$, is used in training along with a desired output signal $z$. Samples of each set of input signals are quantized by conversion to digital representations, and the quantized value of each member of each set are stored in tree storage array as a key. Trained responses dependent upon the signals $u$ and $z$ are stored in random access memory locations at storage locations used only as a new key is encountered thereby to store a trained response of the processor for each key. Following training, trained responses are extracted from storage locations determined by samples of a like set of input signals.

In a member aspect of tree storage, a trainable processor is provided where successive sets of samples of signals are employed. Means are provided for storing in digital quantized form each member of each contemporary set of input signals and the comtemporary value of the desired processor response for the contemporary set. Means in the processor generate a trained response dependent upon the input set and the desired response. Means including an addressable memory stores at successive memory locations the members of the first input set in a selected order followed by the trained response of the processor to the first set and the desired response. Comparator means compare, in the selected order, members of each subsequent input set with corresponding members in memory. Logic means responsive to comparator means store at successive locations in memory any member of a subsequent input set which does not match its corresponding stored member and store thereafter subsequent members in the selected order along with a trained response for the subsequent input set. Logic means responsive to the comparators may then modify the trained response of a prior input set when a subsequent set matches corresponding members in storage. The system may be structured in response to hardware or software for applying programmed instructions to an automatic data processing machine for carrying out the method of the present invention.

The search method of the present invention is related to those operations in which tree strutures are employed for processing information files.

Functions such as developed in the course of training a processor in accordance with the Bose technique or with the feedback method of application Ser. No. 732,152, filed May 27, 1968, may be stored in a random access memory with the items arranged so that their keys have direct correspondence with those developed in training. In accordance with the present invention, nodes, associated with components of the keys, are rearranged in storage during training in accordance with frequency of selection.

More particularly, control is provided for an automatic trainable signal processing machine which machine has at least one input signal u and a desired output signal $z$ applied thereto for training. The quantized values of the input signal $u$ constitute keys which are stored along with the trained responses in a random access memory as a tree allocated file. The sequence of nodes in the tree is continually revised in dependence upon their relative frequency of selection in order to provide more efficient memory access. For some applications it may be more expedient to effect the revision occasionally in lieu of continual rearrangement.

Structure is provided to store quantized representations of each input signal in digital form. An N register stores a signal representative of the number of the input signals. A reference register stores a signal IDUM, and an IC counter has incrementing structure operable for each new address utilized in the storage. Logic means connected to a level register and to the IC counter includes a plurality of comparison circuits which are connected to at least one of the registers controlling the memory for storage of keys and trained responses to unique values of u. During training, the logic is responsive to the number of times that a particular key is selected. Comparison circuitry compares the numbers of access queries satisfied by each stored key, i.e., selections. The stored keys are rearranged in the tree storage in dependence upon such numbers. The keys having the highest numbers are shifted toward entry node of its filial set in the storage tree for efficient selection during training and thereafter during execution.

For a more complete understanding of the present invention and for further objects and advantages thereof, reference may now be had to the following description taken in conjunction with the accompanying drawings in which.

FIG. 1

Figure 1:
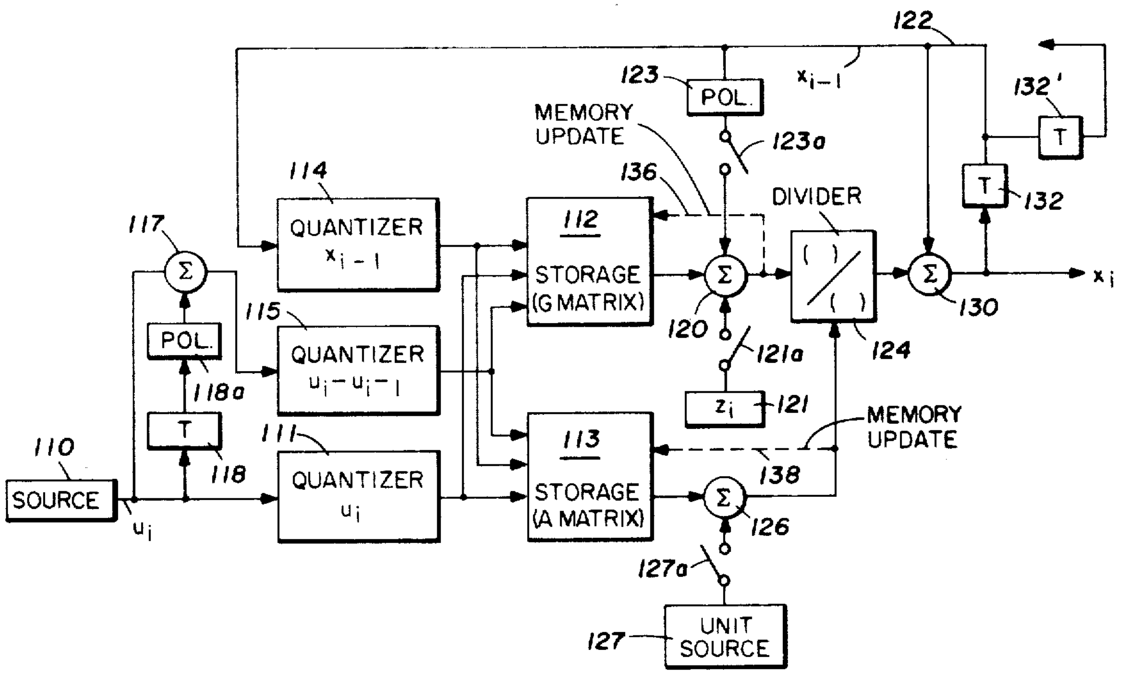
FIG. 1 is a block diagram of one embodiment of applicant's prior system to which the present invention is related.

While the invention may be employed in connection with processes of the Bose type, the processor disclosed and claimed in said application Ser. No. 732,152 will be described herein to provide a setting for the description of the present invention. FIG. 1 illustrates a nonlinear processor characterized by use of closed loop feedback. It may be trained for optimum processing of a single valued time varying function $u$ characterized by two components $u(t)$ and $[u(t)-u(t-T)]$ in the manner disclosed in a generic sense in the Bose U.S. Pat. 3,265,870. Provision is made, however, for reducing the required storage required by Bose by orders of magnitude by use of feedback.

In the following description, the training phase will first be discussed following which operations on signals other than that used for training will be noted.

FIG. 1: TRAINING PHASE

In the following description, the use of a bar under a given symbol, e.g., $u$, signifies that the signal so designated is a multicomponent signal, i.e., a vector. For example, $u = [u_1(t)\ u_2(t)]^T$, where $u_1(t) = u(t)$, and $u_2(t) = [u(t) - u(t-T)]$. The improvement in the processor disclosed in Ser. No. 732,152 is accomplished through the use of a feedback component derived from the delayed output signal, $x(t - T)$. This component serves as a supplemental input which typically conveys far more information than a supplemental input vector derived from the input sequence $u(t-k T)$, $k = 1, 2$, of the same dimensionality. Thus the storage requirements for a given level of performance are materially reduced. As in the Bose patent, the processor is trained in dependence upon some known or assumed function $z$ which is a desired output such that the actual output function $x$ is made to correspond to $z$ for inputs which have statistics similar to u. Thereafter, the processor will respond to signals u', u'', etc., which are of the generic class of u in a manner which is optimum in the sense that the average error squared between z and $X$ is minimized. In the following description, the training phase will first be discussed following which the changes to carry out operations during execution on signals other than those used for training will be described.

In FIG. 1 the first component of signal u from a source 110 forms the input to a quantizer 111. The output of quantizer 111 is connected to each of a pair of storage units 112 and 113. The storage units 112 and 113 will in general have like capabilities and will both be jointly addressed by signals in the output circuits of the quantizer 111 and quantizers 114 and 115 and may indeed be a simple storage unit with additional word storage capacity. The storage units 112 and 113 are multi-element storage units capable of storing different electrical quantities at a plurality of different addressable storage locations, either digital or analog, but preferably digital. Unit 112 has been given a generic designation in FIG. 1 of "G MATRIX" and unit 113 has been designated as an "A MATRIX ." As in application Ser. No. 732,152, the trained responses of the processor are obtained by dividing G values stored in unit 112 by corresponding A values stored in unit 113.

The third quantizer 115 has been illustrated also addressing both storage units 112 and 113 in accordance with the second component of the signal u derived from source 110, the delay 118 and the inversion unit **118*a*. More particularly, if the signal sample $u_t$ is the contemporary value of the signal from source 110, then the input applied to quantizer 115 is $u_t-u_{t-1}$. This input is produced by applying to a summing unit 117 $u_t$ and the negative of the same signal delayed by one sample increment by the delay unit 118. For such an input, the storage units 112 and 113 may be regarded as three dimensional matrices of storage elements. In the description of FIG. 1 which immediately follows, the quantizer 115** will be ignored and will be referred to later.

The output of storage unit 112 is connected to an adder 120 along with the output of a unit 121 which is a signal $z_t$, the contemporary value of the desired output signal. A third input is connected to the adder 120 from a feedback channel 122, the latter being connected through an inverting unit 123 which changes the sign of the signal.

The output of adder 120 is connected to a divider 124 to apply a divident signal thereto.

The divisor is derived from storage unit 113 whose output is connected to an adder 126. A unit amplitude source 127 is also connected at its output to adder 126. The output of adder 126 is connected to the divider 124 to apply the divisor signal thereto. A signal representative of the quotient is then connected to an adder 130, the output of which is contemporary value $x_i$ the processor output. The adder 130 also has a second input derived from the feedback channel 122. The feedback channel 122 transmits the processor output signal $x_i$ delayed by one unit time interval in the delay unit 132, i.e., $x_i-1$. This feedback channel is also connected to the input of the quantizer 114 to supply the input signal thereto.

A storage input channel 136 leading from the output of adder 120 to the storage unit 112 is provided to update the storage unit 112. Similarly, a second storage input channel 138 leading from the output of adder 126 is connected to storage unit 113 and employed to update memory 113.

During the training phase, neglecting the presence of quantizer 115, the system operates as will now be described. The contemporary value $u_i$ of the signal u from source 110 is quantized in unit 111 simultaneously with quantization of the preceding output signal $x_{i-1}$ (which may initially be zero) by quantizer 114. The latter signal is provided at the output of delay unit 132 whose input-output functions may be related as follows:

T is the delay in seconds, $$x_i = x(iT + t_o) \text{ and} \quad (1)$$

$$x_{i-1} = x[\,(i-1)T + t_o], \quad (2)$$

where $i$ is an integer, T is the sampling interval, and $t_o$ is the time of the initial sample. The two signals thus produced by quantizers 111 and 114 are applied to both storage units 112 and 113 to select in each unit a given storage cell. Stored in the selected cell in unit 112 is a signal representative of previous value of the output of adder 120 as applied to this cell by channel 136. Stored in the corresponding cell in unit 113 is a condition representative of the number of times that that cell has previously been addressed, the contents being supplied by way of channel 138. Initially all signals stored in both units 112 and 113 are zero. The selected stored signals derived from storage array 112 are applied synchronously to adder 120 along with the signals $z_i$ and $-x_{i-1}$.

The contemporary output of adder 120 is divided by the output of adder 126 and the guotient is summed with $x_{i-1}$ in adder 130 to produce the contemporary processor response $x_i$. The contemporary value $x_i$ is dependent on the contemporary value $u_i$ of $u$, the contemporary value $z_i$ of the desired output $z$ and negative of $x_{i-1}$, i.e.: $(-x_{i-1})$, as well as the signals from the addressed storage cells.

FIG. 1 — EXECUTION PHASE

The system shown in FIG. 1 establishes conditions which represent the optimum nonlinear processor for treating signals having the same statistics as the training functions [u($t$), z($t$) ] upon which the training is based.

After the system has been trained based upon the desired output $z$ over a statistically significant sequence of u and z, the switches 121$a$, 123$a$, and 127$a$ may then be opened and a new input signal u' employed whereupon the processor operates optimally on the signal u' in the same manner as above described but with the three signals $z_i$, $x_{i-1}$ and unity no longer employed within the update channels. Accordingly, storage units 112 and 113 are not updated.

In the system as shown in FIG. 1, quantizer 115 provides an output dependent upon the differences between sequential samples $u_i$ and $u_{i-1}$, employing a delay unit 118 and a polarity reversal unit 118$a$. In this system a single delay unit 118 is provided at the input and a single delay unit 132 is provided at the output. In general, more delays could be employed on both input and output suggested by 132' shown in FIG. 1. In use of the system with quantizer 115, storage units 112 and 113 may conveniently be regarded as three dimensional. Of course, elements of the input vector and output vector are, in general, not constrained to be related by simple time delays, as for this example and, more generally, the feedback component may relate to the state of the system at $t_{i-1}$ rather than to a physical output derived therefrom. The approach used in FIG. 1 effectively reduces the number of inputs required through the utilization of the feedback signal, hence generally affords a drastic reduction in complexity for comparable performance. Despite this fact, information storage and retrieval can remain a critical obstacle in the practical employment of processors in many applications.

The trained responses can be stored in random access memory at locations specified by the keys, that is, the key can be used as the address in the memory at which the appropriate trained response is stored. Such a storage procedure is called direct addressing since the trained response is directly accessed. However, direct addressing often makes very poor use of the memory because storage must be reserved for all possible keys whereas only a few keys may be generated in a specific problem. For example, the number of storage cells required to store all English words of 10 letters or less, using direct addressing, is $26^{10}$ > 100,000,000,000,000. Yet Webster's New Collegiate Dictionary contains fewer than 100,000 entries. Therefore, less than 0.000,000 1 percent of the storage that must be allocated for direct addressing would be utilized. In practice, it is found that this phenomenon carries over to many applications of trainable processors: much of the storage dedicated to training is never used. Furthermore, the mere necessity of allocating storage on an a priori basis precludes a number of important applications because the memory required greatly exceeds that which can be supplied.

Copending application Ser. No. 837,425 is directed toward minimizing the storage required for training and operating systems of trainable optimal signal processors wherein storage is not dedicated a priori as in direct addressing but is on a first come, first served basis. This is achieved by removing the restriction of direct addressing that an absolute relationship exists between the key and the location in storage of the corresponding trained response.

In an effort to implement direct addressing, the number of key combinations can be reduced by restricting the dynamic range of the quantizers or decreasing the quantizer resolution as used in FIG. 1. For a fixed input range increasing resolution produces more possible distinct keys and likewise for a fixed resolution increased dynamic range produces more keys. Thus with direct addressing these considerations make some applications operable only with sacrificed performance due to coarse quantization, restricted dynamic range, or both. However, when using the tree allocation procedure disclosed in copending application Ser. No. 837,425, memory is used only as needed. Therefore, quantizer dynamic range and resolution are no longer predominated by storage considerations.

In practice quantization can be made as fine as desired subject to the contraints that more training is required to achieve an adequate representation of the training functions and more memory is required to store the trained responses. Thus, resolution is made consistent with the amount of training one wishes or has the means to employ and the memory available.

PROCESSOR TREE STORAGE

A storage method which overcomes the disadvantages of direct addressing is related to those operations in which tree structures are employed for the allocation and processing of information files. An operation based upon a tree structure is described by Sussenguth, Jr., Communications of the ACM, Vol. 6, No. V, May 1963, page 272, et seq.

Training functions are generated for the purpose of training a trainable processor. From such training functions are derived a set of key functions and for each unique value thereof a trained response is determined. The key functions and associated training responses are stored as items of a tree allocated file. Since key functions which do not occur are not allocated, storage is employed only on an "as needed" basis.

More particularly, the sets of quantizer outputs in FIG. 1 define the key function. For the purpose of the tree allocation, the key is decomposed into components called key components. A natural decomposition is to associate a key component with the output of a particular quantizer, although this choice is not fundamental. Further, it will be seen that each key component is associated with a level in the tree structure. Therefore, all levels of the tree are essential to represent a key. The term "level" and other needed terminology will be introduced hereafter.

In the setting of the processors considered herein, the association of a key with a trained response is called an item, the basic unit of information to be stored. A collection of one or more items constitutes a file. The key serves to distinguish the items of a file. What remains of an item when the key is removed is often called the function of the item, although for the purposes here the term trained response is more descriptive.

A graph comprises a set of nodes and a set of unilateral associations specified between pairs of nodes. If node $i$ is associated with node $j$, the association is called a branch from initial node $i$ to terminal node $j$. A path is a sequence of branches such that the terminal node of each branch coincides with the initial node of the succeeding branch. Node $j$ is reachable from node $i$ if there is a path from node $i$ to node $j$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length $(j-1)$ from a root is on the $j^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node $x$ comprises the filial set of node $x$, and $x$ is the parent node of that set. A set of nodes reachable from node $x$ is said to be governed by $x$ and comprises the nodes of the subtree rooted at $x$. A chain is a tree, or subtree, which has at most one branch leaving each node.

In this system, a node is realized by a portion of storage consisting of at least two components, a node value and an address component designated ADP. The value serves to distinguish a node from all other nodes of the filial set of which it is a member. The value corresponds directly with the key component which is associated with the level of the node. The ADP component serves to identify the location in memory of another node belonging to the same filial set. All nodes of a filial set are linked together by means of their ADP components. These linkages commonly take the form of a "chain" of nodes constituting a filial set. Then it is meaningful to consider the first member of the chain the entry node and the last member the terminal node. The terminal node may be identified by a distinctive property of its ADP. In addition, a node may commonly contain an address component ADF plus other information. The ADF links a given node to its filial set. Since in some applications the ADF linkage can be computed, it is not found in all tree structures.

In operation the nodes of the tree are processed in a sequential manner with each operation in the sequence defining in part a path through the tree which corresponds to the key function and provides access to the appropriate trained response. This sequence of operations in effect searches the tree allocated file to determine if an item corresponding to the particular key function is contained therein. If during training the item cannot be located, the existing tree structure is augmented so as to incorporate the missing item into the file. Every time such a sequence is initiated and completed, the processor is said to have undergone a training cycle.

Figure 9:
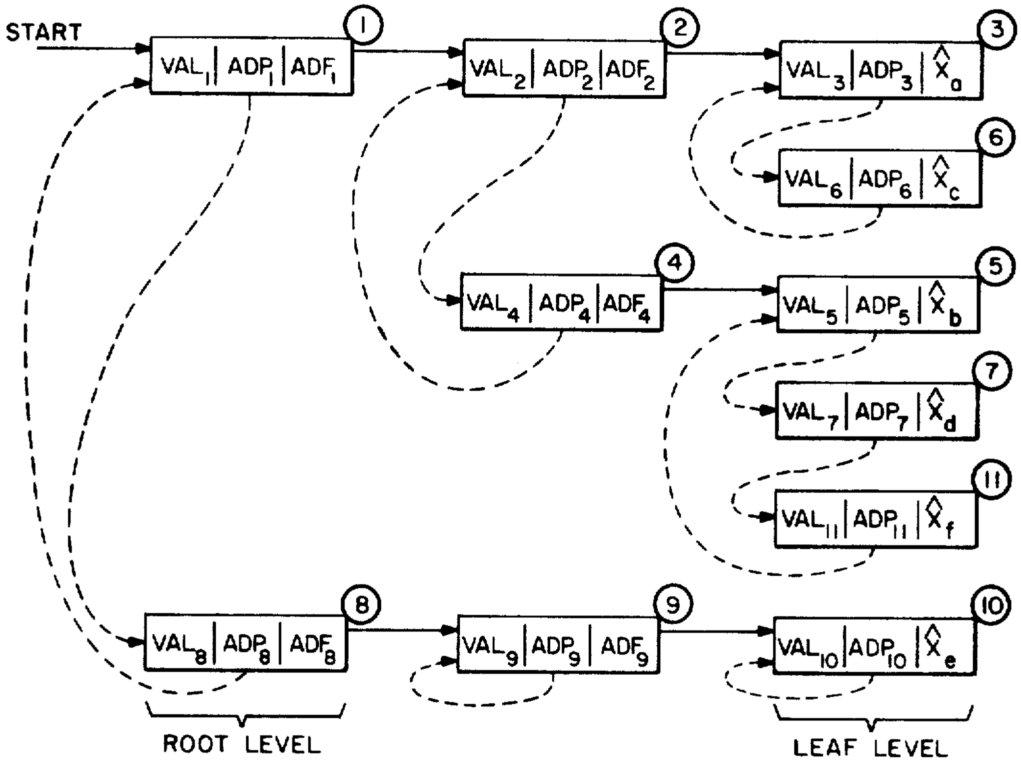
FIG. 9 illustrates schematically a computer representation of a doubly chained tree.
Figure 10:
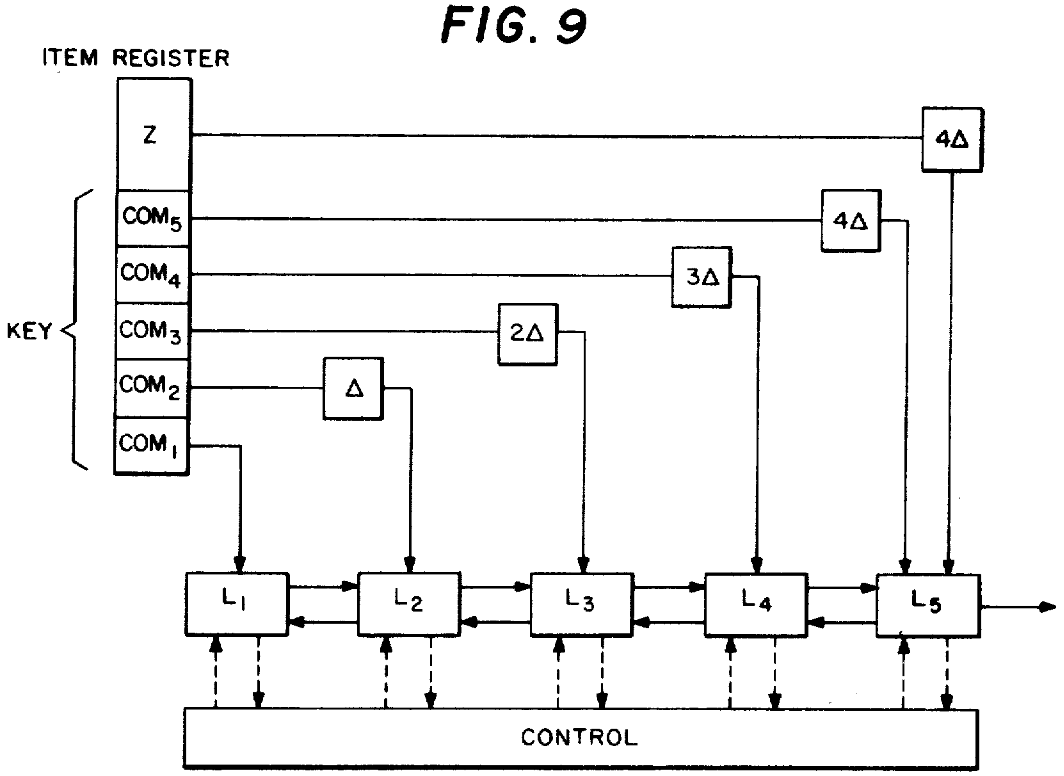
FIG. 10 is a symbolic illustration by which pipeline techniques may be employed in conjunction with the tree storage procedure to effect rapid information storage and retrieval.

The operations of the training cycle can be made more concrete by considering a specific example. Consider FIG. 9 wherein a tree structure such as could result from training a processor is depicted. The blocks represent the nodes stored in memory. They are partitioned into their value ADP and ADF components. The circled number associated with each block identifies the node and corresponds to the location (or locations) of the node in memory. As discussed, the ADP of a node links it to another node within the same filial set and ADF links it to a node of its filial set at the next level of the tree. For example, in FIG. 9, $ADP_1$ links node 1 to node 8 and $ADF_1$ links node 1 to node 2. For clarity the ADP linkages between nodes are designated with dashed lines whereas the ADF linkages are designated with solid lines. In FIG. 9 the trained responses are stored in lieu of ADF component at the leaf node since the leaves have no progeny. Alternatively, the ADF component of the leaves may contain the address at which the trained response is stored. In this setting the system inputs are quantizer outputs and are compared with a node value stored at the appropriate level of the tree.

When the node value matches a quantizer output, the node is said to be selected and operation progresses via the ADF to the next level of the tree. If the value and quantizer output do not match, the node is tested, generally by testing the ADP, to determine if other nodes exist within the set which have not been considered in the current search operation. If additional nodes exist, transfer is effected to the node specified by the ADP and the value of that node is compared with the quantizer output. Otherwise, a node is created and linked to the set by the ADP of what previously was the terminal node. The created node, which becomes the new terminal node, is given a value equal to the quantizer output, an ADP component indicating termination, and an ADF which initiates a chain of nodes through the leaf node.

When transfer is effected to the succeeding level, the operations performed are identical to those just described provided the leaf level has not been reached. At the leaf level if a match is obtained, the trained response can be accessed as a node component or its address can be derived from this component.

A typical operation of this type can be observed in FIG. 9 in which the operations of the training cycle begin at node 1 where the first component of the key is compared with $VAL_1$. If said component does not match $VAL_1$, the value of $ADP_1$ (= 8) is read and operation shifts to node 8 where the component is compared with $VAL_8$. If said component does not match $VAL_8$, the value of $ADP_8$ is changed to the address of the next available location in memory (12 in the example of FIG. 9) and new tree structure is added with the assigned value of the new node being equal to the first key component. Operations within a single level whereby a node is selected or added is termed a level iteration. The first level iteration is completed when either a node of the first level is selected or a new one added. Assume $VAL_1$ matches the first component of the key. Operation is then transferred to the node whose address is given by $ADF_1$ (= 2). At level two, $VAL_2$ will be compared with the second component of the key with operation progressing either to node 3 or node 4 depending upon whether $VAL_2$ and said key component match. Operation progresses in this manner until a trained response is located at the leaf level, or a new leaf generated.

Note in FIG. 9 that the node location specified by the ADF is always one greater than the location containing the ADF. Clearly, in this situation the ADF is superfluous and may be omitted to conserve storage. However, all situations do not admit to this or any other simple relationship, whence storage must be allotted to an ADF component.

Training progresses in the above manner with each new key function generating a path through the tree defining a leaf node at which the trained response is stored. All subsequent repeated keys serve to locate and update the appropriate trained response. During training the failure to match a node value with the output of the corresponding quantizer serves to instigate the allocation of new tree storage to accommodate the new information. In execution, such conditions would be termed an untrained point. This term derives from the fact that none of the keys stored in training matches the one under test during execution.

Figure 8:
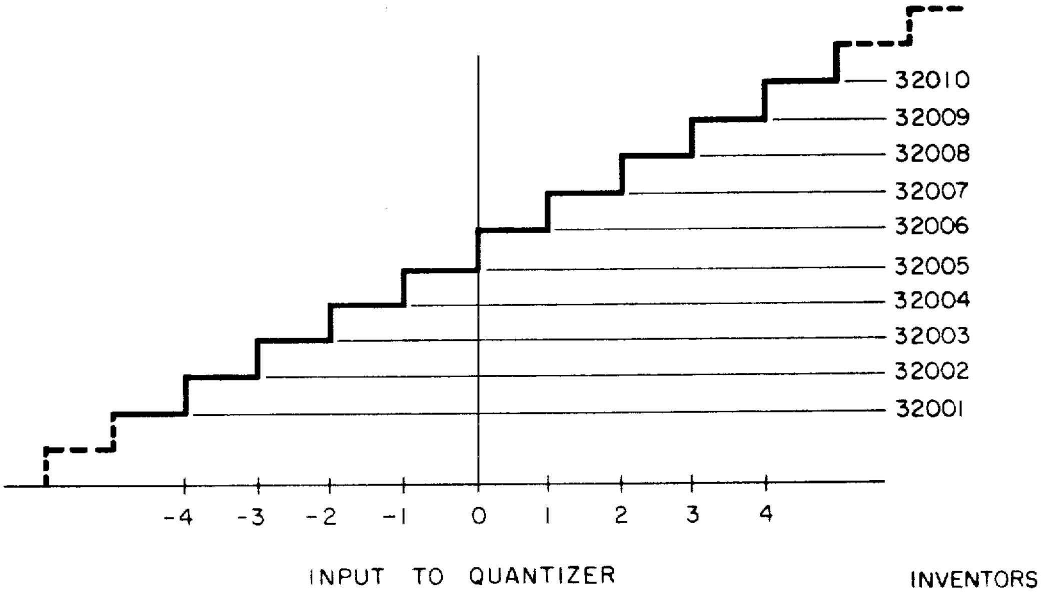
FIG. 8 illustrates the technique of "infinite quantization" employed in the system of FIGS. 3–7.

As discussed previously, when the tree allocation procedure is used, the numerical magnitude of a particular node value is independent of the location or locations in memory at which the node is stored. This provides a good deal of flexibility in assigning convenient numerical magnitudes to the quantizer outputs. As is shown in FIG. 8, the numbers in the region of 32000 were selected as quantizer outputs to emphasize the independence of the actual magnitude of quantizer outputs and because they corresponded to half of the dynamic range provided by the number of bits of storage of the ADP field of the nodes. Thus, as seen in FIG. 8, if the input to a quantizer is between 0 and 1, the output of said quantizer is 32006. Any other magnitude would have served equally well. The resolution can be increased or decreased by changing the horizontal scale so that the input range which corresponds to a given quantizer value is changed. For example, if the scale is doubled, any input between 0 and 2 would produce 32006, any input between 2 and 4 would yeild 32007, etc., so that resolution has been halved. Likewise, the quantizer ranges can be nonuniform as evidenced by nonuniform spacing on the horizontal scale thus achieving variable resolution as might be desirable for some applications.

Another benefit to be realized from the lattitude of the quantizations of FIG. 9 is that the range of the input variables does not need to be known a priori since a wide range of node values can be accommodated by the storage afforded by the VAL field. If the input signal has wide variations, the appropriate output values will be generated. The dashed lines in FIG. 9 imply that the input signal can assume large positive and negative values without changing the operating principle. In effect, the quantizers behave as though they have infinite range. This arrangement is referred to as "infinite quantizing." While the numerical value from the quantizer is not critical, it still must be considered because the larger the number, the more bits of memory will be required to represent it. Therefore, in applications where storage is limited, the output scales of FIG. 9 might be altered.

In this particular invention, each node is partitioned into (1) the key or value, (2) an ADP, (3) and ADF and (4) an N for nonleaf levels. The N values indicate the number of times that a particular node has been selected. Each time a node is selected the N value therein is incremented and that N value is compared with other N values of similar nodes stored in the filial set. If that N value exceeds the other N value for the same filial set, then the storage of that node is arranged so that the key with the largest corresponding N appears earliest in that filial set.

Figure 2:
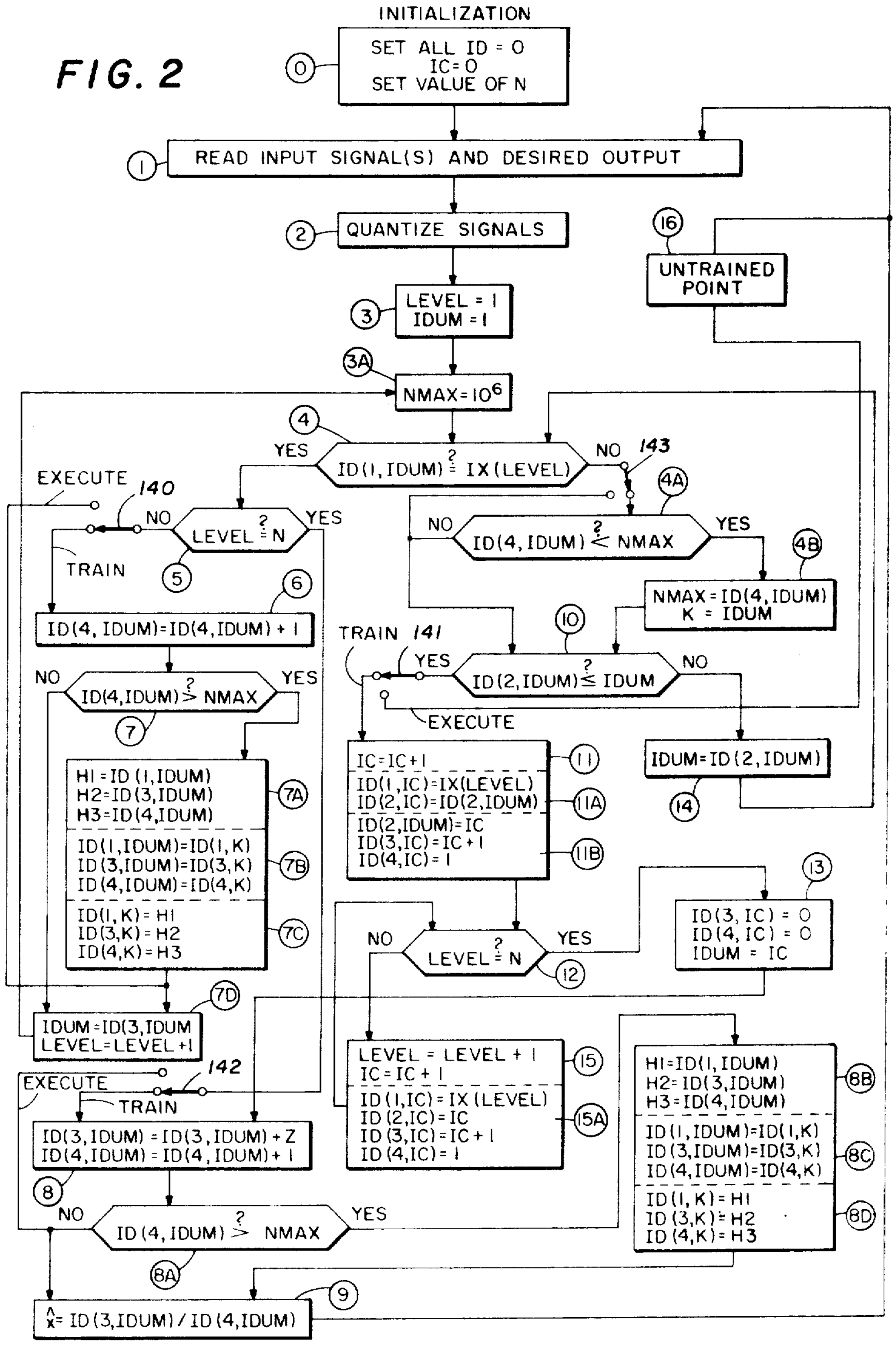
FIG. 2 is a generalized flow diagram illustrating an optimum processor in which storage is utilized only as needed.
Figure 3:
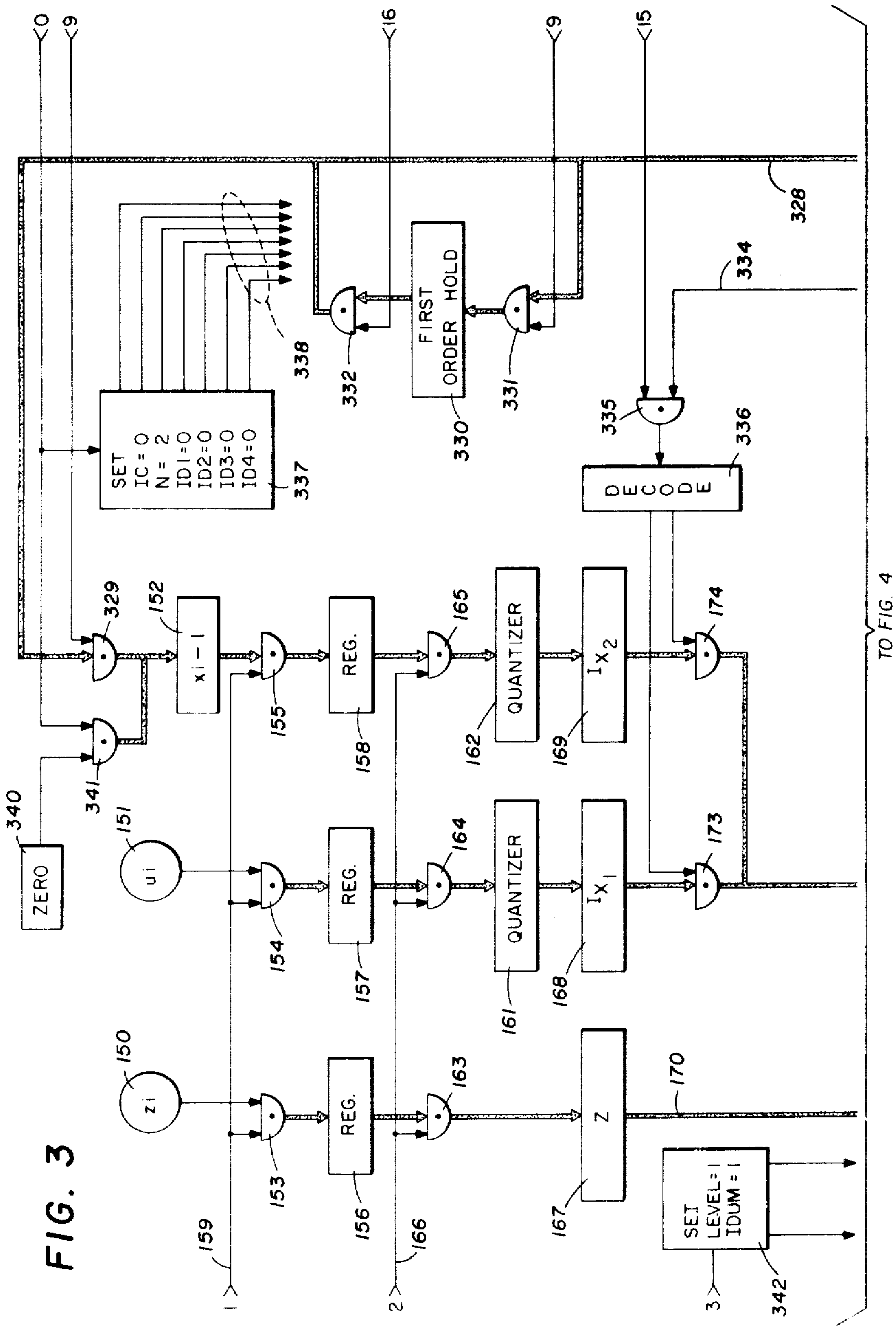
FIGS. 3–7 illustrate a special purpose tree structured digital processor.

FIGS. 3–7 illustrate a special purpose digital computer which automatically will carry out the operations represented in the flow diagram of FIG. 2. FIGS. 3–7 are directed to the specific case where only two input signals $u_t$ and $x_{t-1}$ are employed. The operation is capable of utilizing almost an infinite number of quantization levels as illustrated in FIG. 8 thus making it possible to have a high dynamic range and resolution as fine as desired. As will further be shown, the operation may be carried out by use of appropriate software and a general purpose digital computer. Having described the general setting for the invention, FIG. 2 and FIGS. 3–7 will now be described.

FIG. 2

The present invention involves an improved tree storage operation, continuously or periodically restructuring the storage with what may be termed infinite quantization of the inputs in a trainable nonlinear data processor.

FIG. 2 illustrates a generalized flow diagram in accordance with which multi-input operation may be first trained and then, after training, utilized for processing signals. The invention is directed to operations only involved in the training phase and is not specifically concerned with the execution phase.

The flow diagram of FIG. 2 applies to operations on a general purpose digital computer as well as operation of a special purpose computer illustrated in FIGS. 3–7. It will be noted in FIG. 2, control states 0–16 are assigned to the various operations required in the flow diagram and switches 140–143 are set in position for use during the training phase. When switches 140–143 are changed to the second terminals thereof, the flow diagram will be representative of the operation of the processor after training during the execution phase.

The legends set out in FIG. 2 will best be understood by reference to the specific two input feedback example illustrated in FIGS. 3–7. Briefly, however, the following legends used in FIG. 2 are employed in FIGS. 3–7.

Signal $u_t$ is the input signal which is a single valued function of time and is used for training purposes. Subsequent signals $u_t$ may then be used in execution after training is completed.

Signal $z_t$ is the desired response of the processor to the input signal $u_t$ and is used only during training. Signal $x_{t-1}$ is a response of the processor at time $t_{t-1}$, to $u_{t-1}$ and $x_{t-2}$, etc. Signal $I_x$ is the quantized value of the input $u_t$ and signal $I_x$ is the quantized value of the feedback component $x_{t-1}$, and so constitute the keys for this example.

- ID(1, ), ID(2, ), ID(3, ), and ID(4, ) are first, second, third and fourth storage registers where the blanks are specified by the appropriate variables during operation, the registers also denoted herein as ID1, ID2, ID3, and ID4, respectively;
- IDUM is an incrementing or dummy register, and its contents signify the node identification at any instant during identification;
- N register is a register preset to correspond with the nubmer of inputs, i.e., 2 in the specific example of FIGS. 3–7, $u_t$ and $x_{t-1}$;
- N MAX is a dummy register used to measure the number of times a given node has been selected;
- LEVEL is a register numerically indicating the level in the tree structure and, more particularly, the value stored therein assumes different values during operation, indicating the level of operation within the tree structure at any given time;
- IC is a register corresponding to the addresses of the storage locations in memory storage sections ID1–ID4;
- G is the trained value of storage locations in the four storage registers; and
- A is the number of times a given input set has been encountered in training.

FIGS. 3–7

Referring now to the specific example illustrated in FIGS. 3–7, the special purpose computer is trainable and then may thereafter operate on input signal $u_t$. The deisred response of the system to the signal $u_t$ from source 151 is signified as signal $z_t$ from source 150. The signals $u_t$ and $z_t$ are in general known or available from storage and/or sensor sources, as in the Bose patent. The second signal input to the system, $x_{t-1}$, is supplied by way of register 152 which is in a feedback path and thus is a signal generated as a result of prior oepration of the system, the initial state being zero.

Samples of the signals from sources 150 and 151 are gated, along with the value in register 152, into registers 156–158, respectively, by way of gates 153–155 in response to a gate signal on control line 159. Line 159 leads from the control unit of FIG. 7 and is identified as involving control state 1. The digital representations of the input signals $u_t$ and $x_{t-1}$ stored in registers 157 and 158 are gated into quantizers 161 and 162 by way of gates 164 and 165 in response to control state 2 on line 166. The quantized signals $Ix_1$ and $Ix_2$ are then stored in registers 168 and 169. The desired output signal $z_t$ is sampled through gate 163 and the sample is stored in register 167.

Figure 5:
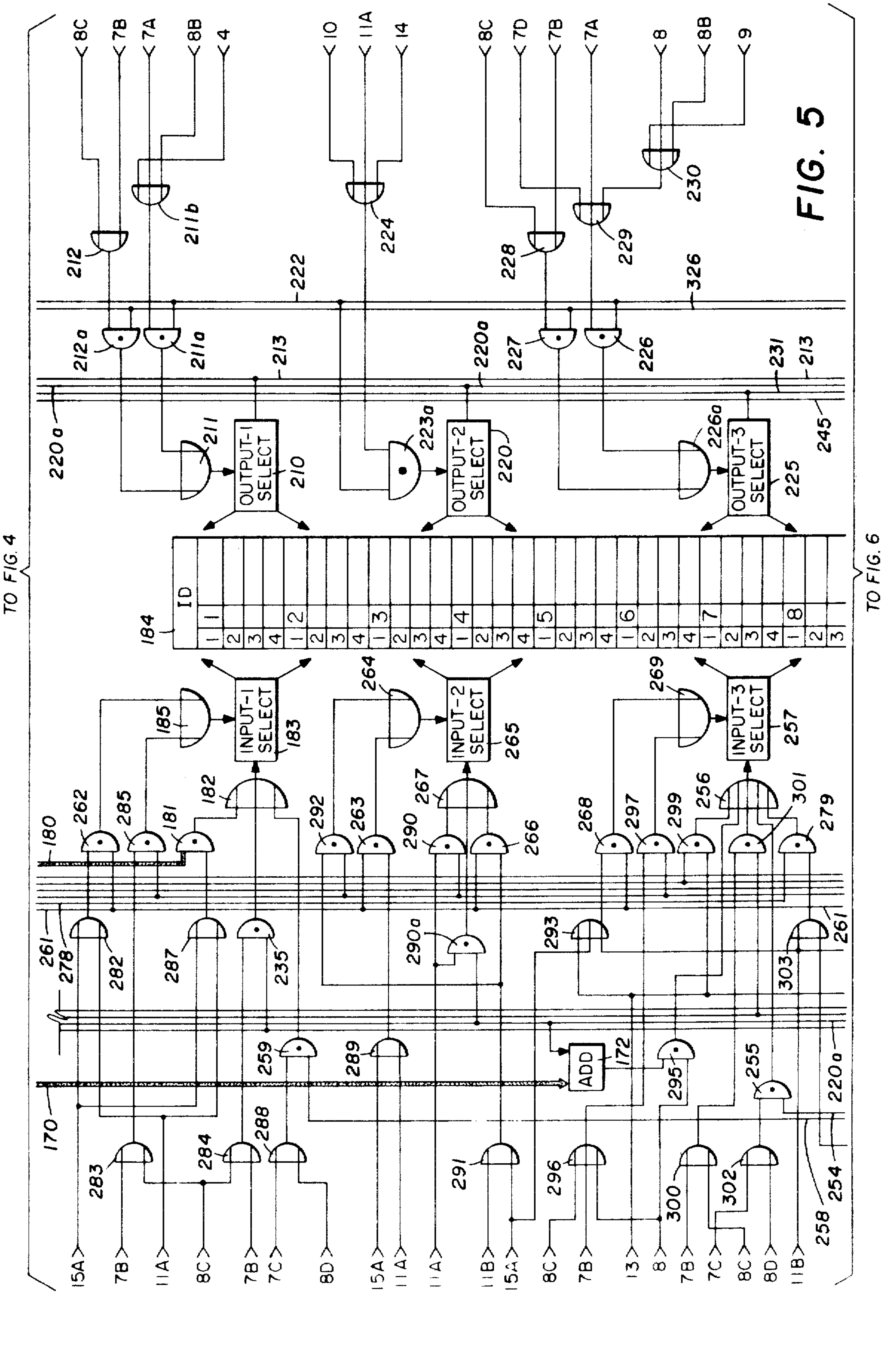
Figure 6:
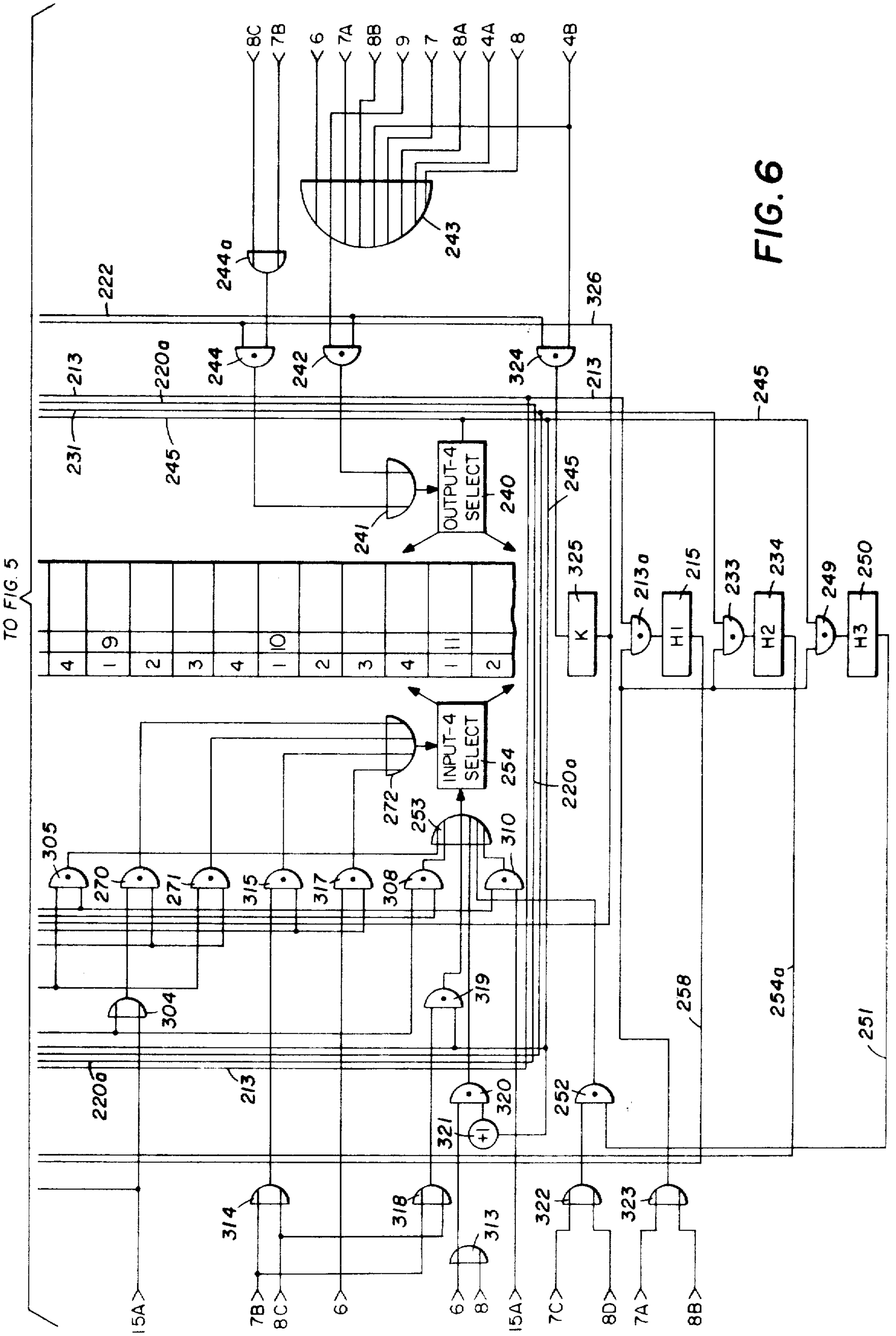

Register 167 is connected by way of line 170 to one input of an adder 172, FIG. 5. Registers 168 and 169 are selectively connected by way of AND gates 173 and 174 and gates 175*a* and 175*b* to an IX(LEVEL) register 175. Gate 175*b* is controlled by control state 3 fed through gate 175*c*. A register 176 is connected along with register 175 to the inputs of a comparator 177. Gate 176*a* controls the operation of register 176 in response to control state 4. The second input to gate 176*a* is supplied by way of line 213 from IDUM register 191.

The TRUE output of comparator 177 appears on line 178. The FALSE output of comparator 177 appears on line 179. Both lines 178 and 179 are connected to the control unit of FIG. 7. Comparator 177 is controlled by control state 4.

IX(LEVEL) register 175 is connected by way of line 180 and gates 181 and 182 to an input-1 select unit 183. Unit 183 serves to store a signal from OR gate 182 at an address in register 184 specified by the output of a gate 185.

Figure 4:
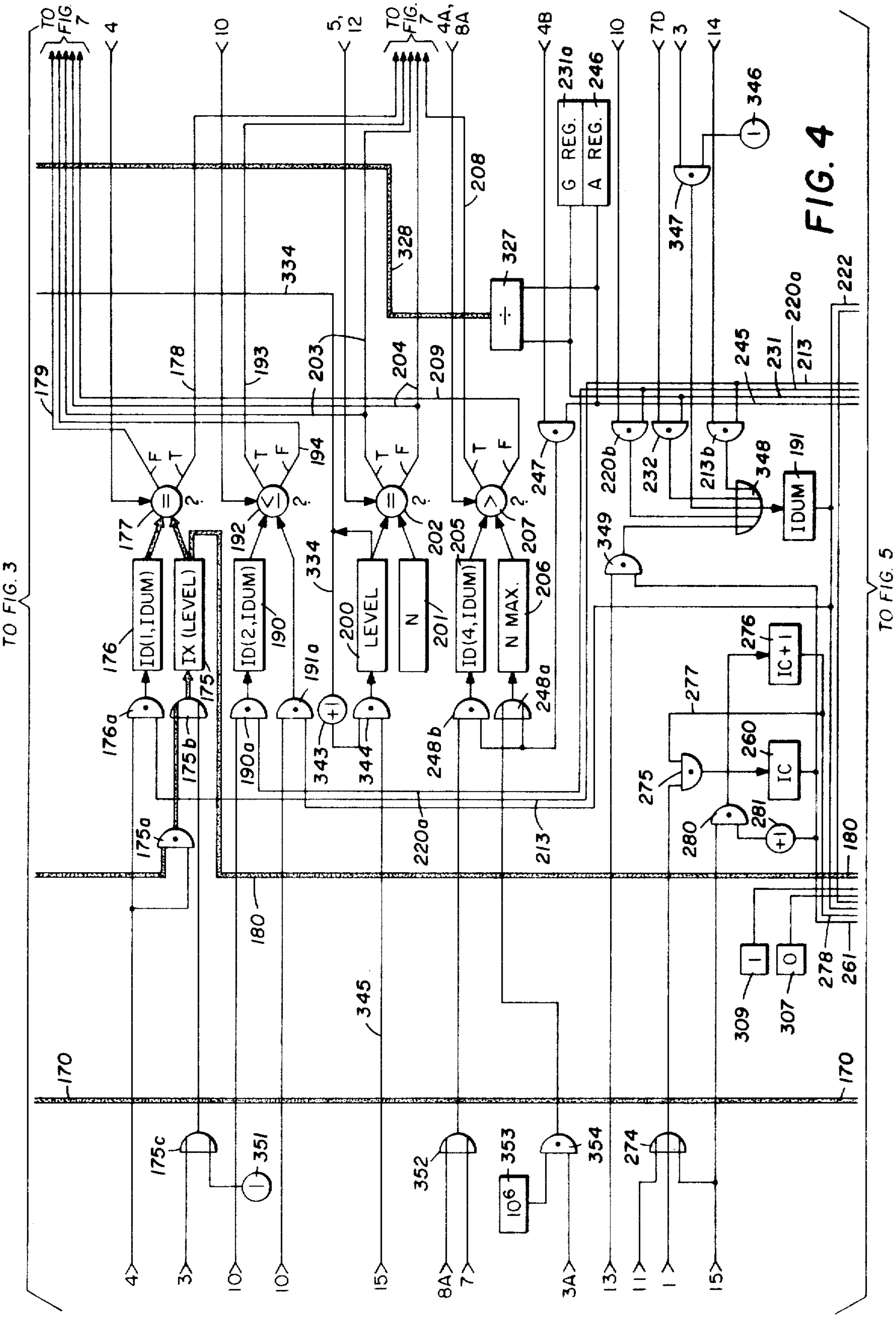

A comparison register 190 and a gate 191a are connected at their outputs to a comparator 192. It will be noted that IDUM register 191, shown in FIG. 4, is connected to one input of gate 191a. The TRUE output of comparator 192 is connected by way of line 193 to FIG. 7. The FALSE output is connected by way of line 194 to FIG. 7.

LEVEL register 200 and N register 201 are connected to a comparator 202. The TRUE output of comparator 202 is connected by way of line 203 to FIG. 7 and the FALSE output of comparator 202 is connected by way of line 204 to FIG. 7.

The outputs of registers 205 and 206 are connected to a comparator unit 207. The TRUE output from comparator unit 207 is connected to FIG. 7 via line 208. The FALSE output is connected to FIG. 7 through line 209.

Thus, input select units 183, 265, 257 and 254 are employed in a conventional manner to effect storage in register 184 at desired addresses. For example, input-1 select unit 183 will store a word in the ID1 portion of register 184 at the address specified by the output of OR gate 185, such address being referred herein by the notation ID(1, ) where the blank is specified by the output of OR gate 185. Similarly, output select units 210, 220, 225 and 240 are employed to read words from register 184 by similarly specifying the address of the selected word. Thus, output-1 select unit 210 (FIG. 5) is actuated by gate 211 from AND gate **211*a* operated by the output from IDUM register 191 and OR gate 211*b*. Gate 211 is also actuated by AND gate 212*a* by OR gate 212 and the state from a K register 325 on line 326 to read a word from the address in register 184 specified by the output of AND gate 211. Control states 7B and 8C control gate 212 while control states 4, 7A and 8B control gate 211b. Output signals read from register 184 are then applied by way of line 213 to the input of gate 176*a* and to a gate 213*a* which is connected at its output to the input of an H1 register 215. The output from the output-1 select unit 210 is fed via the path 213 and gate 213*b* to the IDUM register 191 via OR gate 348. Additionally; the output from output-1 select 210 is fed via path 213 to an AND gate 235 and through the OR gate 182 to input-1 select 183**.

Output-2 select unit 220 serves to read words stored at addresses in the register 184 specified by an address signal from IDUM register 191 appearing on a line 222. Address gate **223*a* for unit 220 is controlled by an OR gate 224 upon appearance of any one of control states 10, 11A or 14**.

The word selected by the output-2 select unit 220 is fed via path **220*a* to the inputs of gates 190*a* and 220*b*. In response to control state 10, the word is applied to registers 190 and 191. Path 220*a* also leads to AND gate 290*a* and input-2 select in response to control state 11A**.

An output-3 select unit 225 operates to read words stored at addresses in the register 184 specified by address signals from either IDUM register 191 or K register 325 appearing on lines 222 and 326, respectively. Line 222 is gated through AND gate 226 while line 326 is gated through gate 227, both of which are gated through OR gate **226*a* to unit 225. Control state signals 7A, 7D, 8, 8B or 9 applied to gates 229 and 230 control gate 226**.

Output-3 select 225 is connected via a path 231 to the IDUM register 191 through an AND gate 232 and OR gate 348. Output-3 select 225 is also connected via the path 231 through an AND gate 233 to an H2 register 234. Output-3 select 225 is also connected via path 231 to G register 231a and is also connected to input-3 select through gates 301 and 256, as well as to an input of divider 327.

Output-4 select 240 is controlled by an OR gate 241 in response to signals from an AND gate 242 which receives addresses via path 222 from the IDUM register 191. AND gate 242 is also controlled by an OR gate 243 operable in response to any one of a plurality of control states, namely control states 4A, 4B, 6, 7, 7A, 8A, 8B or 9. OR gate 241 is also controlled by an AND gate 244 operable in respone to control states 7B and 8C applied by way of OR gate **244*a* and to the address signal from K register 325 appearing on line 326**.

Output-4 select 240 is connected by a path 245 to A register 246 and to the second input to divider 327. Output-4 select 240 is also connected through a gate 247 to an OR gate **248*a* and an AND gate 248*b* which control registers 205 and 206. The output from the output-4 select 240 is also fed via path 245 through an AND gate 249 to an H3 register 250 and also is connected to input-4 select unit 254 by way of gates 319 and 253**.

The output of register 250 is connected via path 251 to the input of an AND gate 252 which controls an OR gate 253. The output of gate 253 is connected to an input-4 select 254 which inputs a signal into the register 184. The output of H2 register 234 is connected via path **254*a* to the input of an AND gate 255 and thence to an OR gate 256 for control of the input-3 select 257. Input-3 select 257 writes into the register 184. Likewise the output of H1 register 215 is fed via line 258 to an AND gate 259 the output of which is connected to OR gate 182 for control of input-1 select 183**.

An IC register 260 provides an output on path 261 which controls an AND gate 262 for control of the OR gate 185. Additionally, the output from the IC register 260 is fed via path 261 to an AND gate 263 for control of OR gate 264 which controls input-2 select 265. The outputs from the IC register 260 also can be connected to the input of an AND gate 266 which controls the OR gate 267 connected to the input-2 select unit 265. The output from the IC register 260 also controls the AND gate 268 which is connected to an OR gate 269 for control of the input-3 select 257. Output signals from the IC register 260 are also applied to AND gates 270 and 271, the outputs of which are fed through an OR gate 272 for control of the input-4 select 254. Aslo, IC register 266 is connected to AND gate 349 via line 361.

Control states 1, 11 and 15 are applied through an OR gate 274 and to an AND gate 275 for control of the IC register 260. An IC+1 register 276 has its output connected via a path 277 to the AND gate 275. The output of the IC+1 register 276 is connected via a path 278 to the input of an AND gate 279 for control of the OR gate 256. A control state 15 is fed to an AND gate 280 for control of the IC+1 register 276. The output of the IC register 260 is connected through an incrementing unit 281 for control of gate 280. A control state 15A is fed to an OR gate 282, the output of which is connected to the AND gate 262. Control state 8C is also fed to OR gates 283 and 284. The output of gate 283 is connected to an AND gate 285, the other input of gate 285 being connected to the output of the IDUM register 191. The output of gate 234 is connected to gate 235. The other input to gate 235 appears on line 213 leading from output-1 select 210. Control states 11A and 15A are also connected through an OR gate 287, the output of which is connected to the AND gate 181. Control states 7C and 8D are connected through an OR gate 288 which is connected to an input of the AND gate 259. An input of the AND gate 263 is connected to the OR gate 289 which is operable in response to control states 15A and 11A. One input of each of gates 266 and 292 is connected to the output of an OR gate 291 whch responds to control state 11B or 15A.

Control states 11B, 13, and 15A control an OR gate 293 which is connected to the input of the AND gate 268. The output of an ADD unit 172 is connected through an AND gate 295 enabled by control state 8 and whose output is connected through an OR gate 256 to the input-3 select 257. Control states 7B, 8 and 8C are connected through an OR gate 296 to the input of an AND gate 297. Signals from the IDUM register 191 are connected to the input of AND gates 285, 292, 290, 297, 315 and 317.

Control states 7B and 8C control an OR gate 300, the output of which is connected to an AND gate 301 connected to the input of the OR gate 256. Similarly, control states 7C and 8D are connected to an OR gate 302 which controls the AND gate 255. Control states 11B and 15A are connected to the input of an OR gate 303. Control states 13 and 15A are connected to OR gate 304. Control state 11B is connected to the input of an AND gate 305, the output of which is connected to the OR gate 253, and control state 11B is also connected to AND gate 271 whose output is connected to OR gate 272.

A zero source 307 is connected to the input of the AND gate 299 and to the input of an AND gate 308. A unity signal source 309 is connected to the input of the AND gate 305 and also to the input of an AND gate 310, the outputs of which are connected to an OR gate 253.

Control states 7B and 8C are connected through an OR gate 314 and thence, along with the IDUM signal on line 322, to an AND gate 315 and thence to an input of the OR gate 272 for control of the input-4 select 254. Control states 7B and 8C are also connected through OR gate 318 to gate 319 to apply the data signal on path 245 through OR gate 253 to input-4 select 254.

Address signals from the IDUM register 191 are connected to an input of the AND gate 317, the output of which, in response to control state 6, is connected to OR gate 272.

Control states 6 and 8 are connected through OR gate 313 to gate 320 to apply the incremented value of the data signal on path 245 leading to AND gate 320 to OR gate 253. More particularly, output signals from the output-4 select 240 are fed through path 245 to a +1 incrementer 321 which is connected to the input of gate 320.

Conrol states 7C and 8D are applied via an OR gate 322 to the input of AND gate 252. Additionally, control states 7A and 8B are connected to the OR gate 323. The enable input of gates 213*a*, 233 and 249 are the same, being electrically connected to the output of gate 323.

The output from the IDUM register 191 is connected via path 222 through an AND gate 324 to a K register 325. The output from the K register 325 is fed via path 326 to the inputs of AND gates 212*a*, 227, and 244. G register 231*a* and A register 246 are connected to the input of a divider 327, the output of which is transmitted by way of path 328 and AND gate 329 to register 152 to provide the feedback signal $x_{i-1}$. The signal on channel 328 is also connected to a first order hold circuit 330 through an AND gate 331. The output of the hold unit 330 is connected via an AND gate 332 back to path 328 in rsponse to control state 16. As will be later described, unit 330 is used, not during the training phase, but during the execution phase, to implement one mode of continuing operation when an input combination is encountered which represents an untrained point.

The signal in the level register 200 is transmitted by way of a path 334 through an AND gate 335 to a decoder 336 for selective control of gates 173 and 174. A separate control unit 337 responsive to control state 0 is connected by way of channels 338 to provide initial settings in each of IC register 260, N register 201, and register 184 which is denoted in control unit 337 as ID1–ID4. The actual connections of channels 338 to the registers 260, 201 and 184 are not shown in order to simplify the illustration.

A zero state from a source 340 is applied by way of AND gate 341 under control state 0 to register 152 initially to set register 152 to zero. A second initial control unit 342 is provided to preset LEVEL register 200 and IDUM register 191 in response to control state 3. The actual connections from control unit 342 to registers 200 and 191 are not shown for simplicity.

LEVEL registered 200 is connected by way of an incrementer 343 and thence, by way of AND gate 344, to increment the storage in register 200 in response to control state 15 applied by way of path 345.

A unit source 346, FIG. 4, is connected, in response to control state 3, through an AND gate 347 to an input of an OR gate 348. The output of AND gates 220b, 232 and 213b are also applied to the OR gate 348. The output of an AND gate 349 in response to control state 13 also is connected to control gate 348. More particularly, the output of the register 260 is fed to one input of the AND gate 349, with the control state 13 being applied to the other input thereof.

A unit source 351 is connected to an input of the OR gate 175c which controls the OR gate 175b in rsponse to control state 3.

Control states 7 and 8A enable OR gate 352, the output of which is connected to the AND gate 248b effectively to connect path 245 to register 205.

A $10^6$ source 353 is connected to an input of the AND gate 354, the output of which is connected to the OR gate 248a for loading the N MAX register 206 in response to control state 3A.

Referring again to FIG. 2, it will be seen that control states 0–16 have each been defined in terms appropriate to the flow diagram. The control states labeled in FIG. 2 correspond with the control states to which reference has been made heretofore and described in FIGS. 3–7. Control lnes upon which control states (voltages) appear are shown on the margins of the drawings of FIGS. 3–7 and are labeled in conformity with the control states designated on FIG. 2.

FIG. 7

Figure 7:
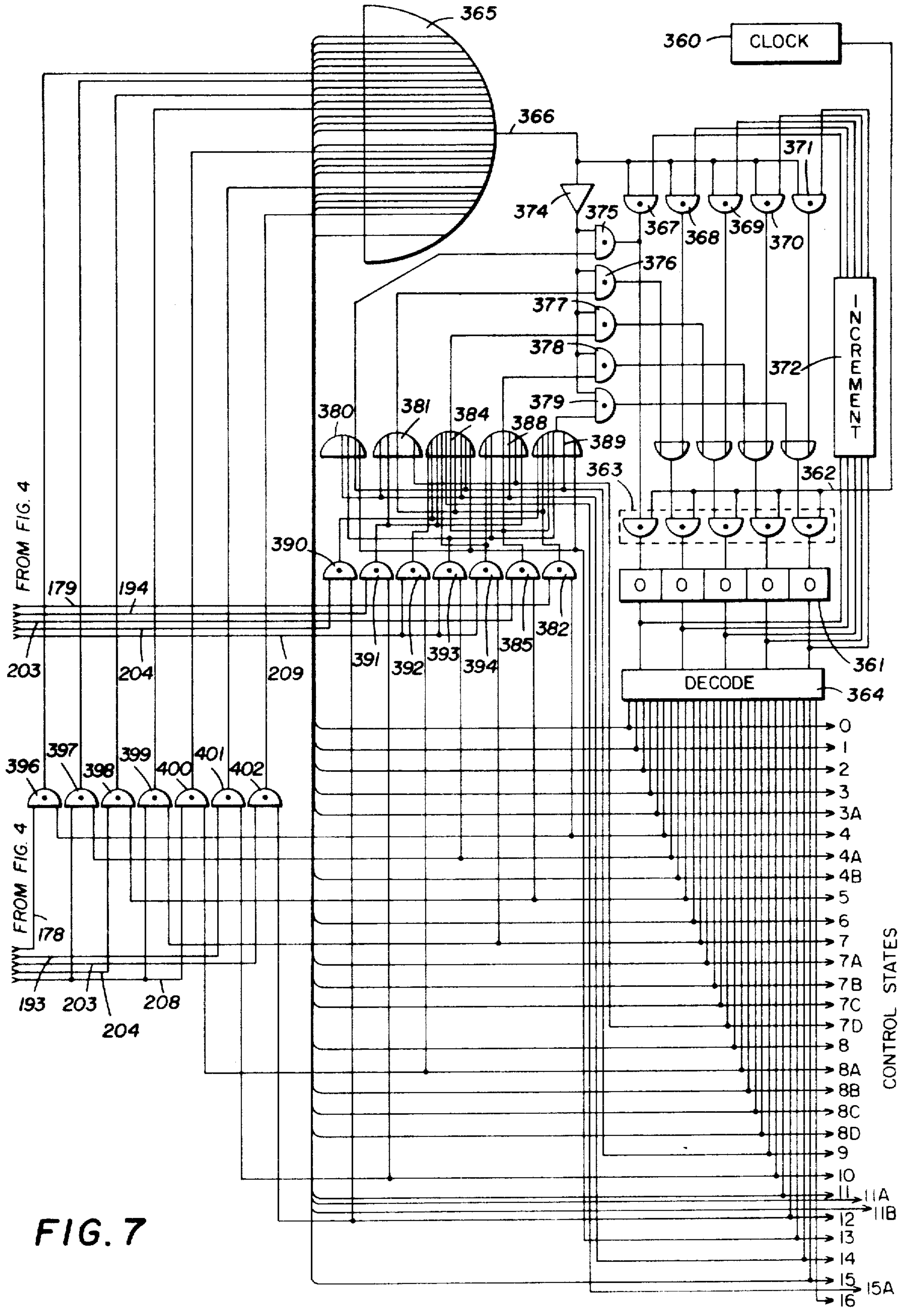

Referring to FIG. 7, the control states are produced in response to a clock 360 which is connected to a counter 361 by way of path 362 through AND gates 363. Counter 361 is connected to a decoder 364 which has an output line for each of the control states 0-16. The control states are then applied, by way of the lines labeled at the lower right-hand portion of FIG. 7, to the various input terminals correspondingly labeled on FIGS. 3-6.

The control lines for the control states 0, 1, 2, 3, 3A, 4B, 6, 7A, 7B, 7C, 8, 8B, 8C, 8D, 11, 11A, 11B, and 15 are connected by way of OR gating logic represented by the OR gate 365 to line 366. The output of gate 365 is thus connected by way of line 366 to each of gates 367-371. The second inputs to gates 367-371 are supplied by way of an incrementer 372 whose input is connected to the outputs of the counter 361.

The output of gate 365 is also connected by way of an inverter unit 374 to one input of each of the gates 375-379. The second inputs of the gates 375-379 are supplied from logic leading from the compartors of FIG. 4 and from the decode unit 364. By way of example, control line 9 is connected by way of OR gate 380 to the second input of the gate 375. The second input for gate 376 is controlled by the output of AND gate 382 via OR gate 381. Gate 382 is energized by the control state 4 from the decode unit 364 and from line 179 leading from comparator 177, FIG. 4. Gate 377 is controlled by gate 385 via gate 384. Gate 385 is responsive to control state signal 5 and the line 203 leading from comparator 202, FIG. 4.

Gate 378 is controlled by the output of AND gate 385 via OR gate 388. Gate 379 is controlled by an OR gate 389. Some of the inputs of each of the gates 380, 381, 384, 388, and 389 are commonly tied to each other and are connected to the AND gates 390-394, as well as gates 382 and 385. Gates 382, 385 and 390-394 are controlled by voltages appearing on the leads 179, 194, 203, 204 and 209, as well as from various ones of the control states as illustrated in FIG. 7.

AND gates 396-402 have inputs connected to various ones of the leads 178, 193, 203, 204 and 208 leading from the comparators of FIG. 4. The other inputs of the gates 396-402 are connected to selected ones of the control states. The outputs from gates 396-402 are connected to inputs of the gate 365.

In operation, the control system of FIG. 7 provides control states 0-16 in sequence except where a jump or a return is required by the flow chart of FIG. 2. More particularly, deviations from an ordered sequence as required by FIG. 2 are shown in Table I. Such deviations are implemented in FIG. 7 for the training phase. Deviations for the execution phase are noted in Table I but have not been shown in FIG. 7 since the present invention is particularly concerned with the traning phase.

TABLE I

| Control State | Condition | Next Control State |
|---|---|---|
| 4 | No | 4A—Train |
| | No | 10—Execute |
| | Yes | 5 |
| 4A | Yes | 4B |
| | No | 10 |
| 4B | | 10 |
| 5 | No | 6—Train |
| | No | 7D—Execute |
| | Yes | 8—Train |
| | Yes | 9—Execute |
| 7 | Yes | 7A |
| | No | 7D |
| 7D | | 3A |
| 8A | Yes | 8B |
| | No | 9 |
| 9 | | 1 |
| 10 | Yes | 11—(Train) |
| | Yes | 16—(Execute) |
| | No | 14 |
| 12 | Yes | 13 |
| | No | 15 |
| 13 | | 8 |
| 14 | | 4 |
| 15A | | 12 |

FIGS. 3-7 — OPERATION

The purpose of the present invention is to provide for either continuous or intermittent reordering of the information stored in the storage unit 184 during training of the processor. It should be understood that there are four separate types of signals or data groups stored in register 184 denoted as ID1-ID4. For this purpose, the second column of the addresses shown on register 184 is the node identification and thus, the storage registers are number sequentially to illustrate use of a first come first served memory operation. The first column may be taken to desegregate the four parts of each storage register. More particularly, the first column includes like sets of the integers 1, 2, 3, 4. This legend in the second column designates the address of a register and the first column indicates a particular portion of a given register.

The first part of a register is used to store a key, i.e.: the value of $I_x$. The object of the operation at any given tree level is to locate a key already in storage at that time which can be selected. If not selected, the value stored in a second part is utilized as an address for another node to be considerd for selection. Further, the numerical value of the second part serves in the comparison of state 10, FIG. 2, to produce an indication as to whether or not there is another key in storage to be considered for selection. If said level is a nonleaf level and a key is selected, then the value stored in the third part is utilized as an address for a subsequent node in the next tree level to be considered for selection. If said level is the leaf level, the information denoted as G and A is stored in the third and fourth parts, respectively.

If said level is not the leaf level, then the fourth part serves to store an indicia representing the number of times the key stored in the first part has been selected. Since this indicia depend upon the frequency of selection, it is employed herein as a basis for rearrangement of the order of storage in the tree. Register parts making up storage 184 may thus be considered to comprise: (1) a key, (2) and ADP, (3) and ADF, and (4) an N for nonleaf levels and at the leaf level (1) a key, (2) an ADP, (3) a G, and (4) an A.

Input-1 select 183 and output-1 select 210 serve exclusively to write or read the key. Input-2 select 265 and output-2 select 220 write and read the ADP portion only. Input-3 select 257 and output-3 select 225 write and read the ADF and G portions. The input-4 select 254 and the output-4 select 240 write and read N and A.

In operation, this invention corresponds with the invention disclosed and described in applicant's prior application (TI-3495) in its use of infinite quantization and tree storage. The operation is very much the same and the flow diagram of FIG. 2 is very much the same as the flow diagram in said prior application. Thus, the detailed description and the examples of operation included in said prior application will not be repeated here but are incorporated by reference. The present invention differs from the prior invention principally in comparing, in control state 4A, the N values stored in part 4 of a given register with the N value similarly stored for other nodes in the same filial set. If the N value stored in said given register exceeds the other stored N values for said filial set, then the key, ADF and N parts are rearranged so that the key with the largest corresponding N appears earliest in the filial set. This required the provision and use of the ID3 and ID4 parts of storage 184, the addition of the comparators 202 and 207, the associated comparator registers 200, 201, 205 and 206 and their control elements, the addition of the K storage register 235, and H1-H3 storage registers 215, 234, 250, FIG. 6, and N MAX register, FIG. 4.

If a node is not selected, then N MAX serves as temporary storage of ID 4 and K serves as temporary storage of the node identification. Using ADP the search moves to the next node under consideration. Assume the key portion of the node under consideration is selected, the N portion is incremented by a +1. The new value of N at this node is compared with the value of N MAX in comparator 207. If N exceeds N MAX, rearrangement is then carried out.

In rearranging, H1–H3 serve as temporary storage of the value of the key, ADF and N of the node whose key was selected. The corresponding portions (key, ADF and N) of node identified by K are transferred into the address of the selected node. Then the contents of H1–H3 are transferred to the address of the node identified by K and operation then proceeds normally. If N does not exceed N MAX in comparator 207, no arrangement is effected.

If the node is not selected, the values of N MAX and K are changed appropriate to maintain the members of a filial set in accordance with decreasing values of N. With the above in mind, it will be apparent that the invention involves operations during the training phase only.

In terms of the flow chart of FIG. 2, the reordering of the values in storage takes place in steps 7A, 7B and 7C in those instances where the comparison in control state 7 is positive or true. The rearrangement also is undertaken in steps 8B, 8C and 8D when the comparison in control state 8A is true. From FIG. 2, it will be noted that during control state 7A the values stored in storage 184, namely ID(1,IDUM), ID(3,IDUM), ID(4,IDUM) are extracted from storage 184 and are temporarily stored in the registers H1–H3, respectively. During control state 7B the value in storage 184 at addresses ID(1,K), ID(3,K), and ID(4,K) are transferred into the same locations as the values that were read from storage 184 during control state 7A, namely ID(1,IDUM), ID(3,IDUM) and ID(4,IDUM). Thus, this moves the training point more frequently encountered into a location in the storage tree of higher order in the filial set. While this is being done, the values less frequently encountered are temporarily stored in the registers 215, 234 and 250 (H1–H3). The final step to complete the interchange takes place in control state 7C. More particularly, data stored in registers H1–H3 are placed back in storage 184 at the addresses of those values that were extracted in control state 7B. More particularly, the data stored in registers H1, H2 and H3 are placed back in storage 184 at addresses ID(1,K), ID(3,K) and ID(4,K), respectively. Thus, control states 7A, 7B and 7C control and call for the interchange of data in the storage tree such that the most selected keys will be at locations higher in order in the filial set.

It will be noted that the comparison in control state 7 is exactly the same as the comparison in control state 8A. Further, the same operation is performed in control states 8B, 8C and 8D as in control states 7A, 7B and 7C. Thus, any time the value stored in ID(4,IDUM) exceeds the value stored in the storage 206, then the system is conditioned for an interchange of the respective sets of data.

As noted, in control state 4A a comparison is made to see if the value stored in ID(4,IDUM) is greater than the number stored in register 206 (N MAX). When the value stored in ID(4,IDUM) does exceed N MAX, then in control state 4B the number stored in register 206 is made equal to ID(4,IDUM) and the number stored in the K register 235 is made equal to the value stored in IDUM register 191.

Again it will be noted that words are stored in register 184 by selecting an address, for example through the input-1 select unit 183 by means of actuation through AND gate 185. The data to be stored in the ID1 portion of storage 184 is applied through the unit 183 by way of OR gate 182. Similarly, the ID1 portions stored in storage 184 are read therefrom through unit 210 by selecting the address through OR gate 211 and applying the output therefrom to path 213. The flow diagram of FIG. 2 is thus a key to the operation of the system shown in FIGS. 3–7.

As previously explained, the control unit of FIG. 7 normally would provide output control states in the sequence indicated in the lower right-hand portion of FIG. 7 at the clock pulse rate. However, the flow diagram of FIG. 2 requires jumps and iterations within the process so that the control system must respond to and carry out the desired iterations and jumps. The control states will be generated as true values on the output lines in the order required and at the times indicated in the flow diagram of FIG. 2.

The training values end up in storage 184 at the end of the training phase in the order in the tree corresponding with frequency of selection during the training operation. Thereafter, the system will be altered in the manner indicated by the presence of switches 140–143, FIG. 2, so that the trained system is available and ready for operation, retrieving the data from storage 184 as necessary to provide the proper output signals in response to input signals.

It will be further appreciated that the system is presented in FIGS. 3–7 in the form of a special purpose digital computer where the system is totally prewired and is responsive to the control states generated in FIG. 7.

The preferred form, at the present time, for carrying out the invention is by means of a properly programmed general purpose digital computer. In implementing the same and carrying out the training portion of that operation, a program as set forth in the following Table II was employed. This program is written in Fortran V Level language and will thus be familiar to those involved in such programming of digital computers.

In general, the following subroutine implements the flow diagram of FIG. 2 beginning with state 3 of FIG. 2. States 0-2 will have been implemented before the subroutine comprising Table II is called.

For example, note that statement 23, Table II, is equivalent to the operation of state 4, FIG. 2. Some of the variables listed in Table II ARE RELATED TO FIG. 2 as follows:

- N, Z, IC, IDUM, and LEVEL are the same in Table II as in FIG. 2.
- IX is the array containing the quantized signals denoted in FIG. 2 as IX(LEVEL).
- IGROW is a logical variable controlling whether the processor is in the training mode or execution mode; e.g. IGROW = .TRUE. means that circuits represented by switches 140–143 are set as indicated by the switch positions shown in FIG. 2 and IGROW = .FALSE., the switches would be actuated to the second positions shown in FIG. 2.
- ICOUNT is a counter which couns the number of leaves (not present in FIG. 2).
- IUNTRAIN is a logical variable set to TRUE during execution if an untrained point is encountered.
- ESP is a logical variable indicating whether or not a search procedure will be used in the event an untrained point is encountered in execution and this is not involved in training. For example, statement 146 "CALL SEARCH" is used only if ESP is TRUE.
- W plays the role of *x* of FIG. 2.
- NT and IDUM2 in Table II correspond to NMAX and K of FIG. 2.
- KTEMP, JTEM and LTEMP correspond to H1, H2 and H3, FIG. 2, respectively.

There are some differences between the operations specified by the subroutine of Table II and those of FIG. 2. In the subroutine, direct addressing is employed for the first level. All subsequent levels employ tree storage with rearrangement as above described.

The variable M1 in the program is a measure of amount of direct storage allocated for the first level. Because of direct addressing in the first level, control state 3 involves initializing LEVEL = 2 rather than LEVEL = 1 as indicated in FIG. 2. This occurs in the following program in statement No. 10. In the program, LEVEL never = 1; it is always 2 or greater.

Further, the ratio G/A · RS is stored in ID3 when at leaf level and A is stored in ID4. RS will be recognized as a sealing factor employed to preserve decimal location since ID3 is an integer variable in the program. Storage of the ratio G/A avoids storage overflow and a preferred implementation of the flow diagram of FIG. 2 would involve storage of the ratio rather than G alone in ID3.

The program variable GI is an adaptive weighting of the character described and claimed in prior application Ser. No. 786,059, filed Dec. 23, 1968 for "Adaptive Weighting In Training Feedback Miimized Optimum Filters and Predictors". In the implementation of FIGS. 3–7, GI has been always equal to 1. Adaptive weighting provides for increased emphasis during training by increasing GI as may be appropriate to a given application.

TABLE II

```
               SUBROUTINE TREE
                 (N,IX,M1,IGROW,ICOUNT,E
                 -
                 SP,Z,W,GI,ID,IUNTRN,FV
               LOGICAL*4
                 IGROW,ESP,IUNTRN
               COMMON MI,RS
               COMMON /NODE/ IC
               DIMENSION IX(1),ID(4,j)

C              RS REPRESENTS DESIRED
                 RESOLUTION OF OUTPUTS
               IR = RS
               IG = GI
               IDUM = IX(1)
               LEVEL = 2
               NM1 = N-1
               IF(ICOUNT,EQ,O) IC = M1 + 1
               IF (NOT, IGROW) GO TO 710

C              THE NEXT STEPS
                 DETERMINE WHETHER
                 NODE EXISTS AT ENTRY
                 POINT
       490     IF(ID(1,IDUM)500,480,502
       480     ID(2,IDUM) = IDUM
               IF(N,EQ,2) GO TO 1011
               TO TO 1000
       500     WRITE(6,501)
       501     FORMAT(/5X,40H ERROR IN
                 NODE STORAGE, RUN
                 TERMINATED, )
               STOP

C              NODE EXISTS, TEST KEY FOR
                 MATCH
       502     IF(ID(u,IDUM),EQ,IX(LEVE
                 L))GO TO 504
               IF(ID(2,IDUM),LE,IDUM)GO
                 TO 506
               NT = ID(4,IDUM)
               IDUM2 = IDUM
               IDUM=ID(2,IDUM)
               GO TO 507

C              MATCH, GO TO FILIAL SET,
                 IF LEAF, UPDATE ONLY,
       504     IF(LEVEL,EQ,N)GO TO 1030
               ID(4,IDUM)=ID(4,IDUM)+1
               DIUM=ID(3,IDUM)
               LEVEL = LEVEL + 1
               GO TO 502

C              NO MATCH AND NO OTHER
                 NODES IN PARENT SET,
                 FORM A NEW CHAIN.
       506     ID(2,IC) = ID(2,IDUM)
               ID(2,IDUM)=IC
               IDUM=IC
               IC=IC+1
               IF(IC,GE,MI) GO TO 1001
               IF(LEVEL,N)GO TO 1020

C              THE FOLLOWING
                 COMPLETES A CHAIN
                 THROUGH THE LEAF
      1000     DO 1010 II = LEVEL, NM1
               ID(1, IDUM) = LEVEL, NM1
               IF(II,EQ,LEVEL) TO TO 41
               ID(2,IDUM)=IDUM
        41     ID(3,IDUM)=IC
               ID(4,IDUM)=ID(4,IDUM)+1
               IDUM=IC
               IC=IC+1
               IF(IC,GE,MI) GO TO 1001

      1010     CONTINUE
      1011     CONTINUE

C              THE FOLLOWING IS
                 COMMON TO THE
                 GENERATION OF A NEW
                 LEAF
               ID(2,IDUM)=IDUM
      1020     ID(1,IDUM)=IX(N)
```

```
C              THE FOLLOWING IS
                 COMMON TO UPDATING
                 AND EXISTING LEAF
               IF(ID(4,IDUM),GE,1) GO TO
                 1030
               ICOUNT = ICOUNT + 1
      1030     C = Z*GI*RS
               A = ID(3,IDUM)
               B = ID(4,IDUM)
               ID(4,IDUM)=ID(4,IDUM)+IG
               A = (A*B+C)/(B+CI)
               W = A / RS
               ID(3,IDUM) = A +0,50

C              PREPARE FOR, AND EFFECT
                 RETURN TO TRAINING
                 MODE ITERATION
               GO TO 110
      507      IF(ID(1,IDUM)EQ,IX(LEVEL))
                 GO TO 30
               IF(ID(2,IDUM,LEIDUM) GO
                 TO 31
               IF(ID(4,IDUM)-NT) 32,33,33
      32       NT = ID(4,IDUM)
               IDUM2 = IDUM
      33       IDUM = ID(2,IDUM)
               GO TO 507
      30       IF(LEVEL,EQ,N) GO TO 34
               ID(4, IDUM) = ID(4, IDUM) + 1
               IF(ID(4, IDUM)-NT)35, 35, 36

      36       KTMP = ID(1,IDUM)
               JTEMP = ID(3,IDUM)
               LTEMP = ID(4,IDUM)
               ID(1,IDUM) - ID(1,IDUM2)
               ID(3,IDUM) = ID(3,IDUM2)
               ID(j,IDUM) = ID(4,IDUM2)
               ID(1,IDUM2) = KTEMP
               ID(3,IDUM2) = JTEMP
               ID(4,IDUM2 ) = LTEMP
               IF(LEVEL,EQ,N) GO TO 38
               IDUM = IDUM2
      35       IDUM = ID(3,IDUM)
               LEVEL = LEVEL+1
C              NT = ID(4,IDUM)
C              IDUM2 = IDUM
C              IF(LEVEL,EQ,N) NT =
                 1000000
               NT = 1000000
               GO TO 507
      31       ID(2,IC) = ID(2,IDUM)
               ID(2,IDUM) = IC
               IDUM = IC
               NT = 1000000

C              POSSIBLE TROUBLE IF A
                 CELL TRAINED MORE
                 THAN 1000000 times

               IC = IC + 1
               IF(IC,GE,MI) GO TO 1001
               IF(LEVEL,EQ,N) GO TO 37
               DO 39 II= LEVEL,NM1
               ID(1,IDUM=IX(II)
               IF(II,EQ,LEVEL) GO TO 40
               ID(2,IDUM)=IDUM
      40       ID(3,IDUM)=IC
               ID(4,IDUM)=ID(4,IDUM)+1
               IDUM=IC
               IC=IC+1
               IF(IC,GE,MI) GO TO 1001
      39       CONTINUE
               ID(2,IDUM)=IDUM
      37       ID(1,IDUM)=IX(N)
               IF(ID(4,IDUM),GE,1)GO TO 34
               ICOUNT=ICOUNT + 1
      34       C = Z*GI*RS
               A = ID(3,IDUM)
               B = ID(4,IDUM)
               ID(4,IDUM) = ID(4,IDUM)+ IG
               A = (A*B+C)/(B+CI)
               W = A / RS
               ID(3,IDUM) = A = 0,50
               IF(ID(4,IDUM),LENT) GO TO
                 38
               GO TO 36
      38       GO TO 110
      1001     WRITE (6,1003)
      1003     FORMAT(5X,'SORRY,BUT
                 DIMENSION OF ID HAS
                 BEEN EXCEEDED, STOP')
      1004     STOP
      110      CONTINUE
```

```
               RETURN
      710      CONTINUE

C              TESTING FOLLOWS
               ICOUNT = ICOUNT + 1
               IF(ID(1,IDUM)) 20,28,22
      20       WRITE(6,23)
      23       FORMAT(/5X,'ERROR HAS
                 OCCURED IN EXECUTION,
                 RUN TERMINATED,')
               GO TO 5
      28       IF(ESP) GO TO 505
               GO TO 510
      505      LEVEL = 1
               WRITE(6,4) ICOUNT
      4        FORMAT (5X,'INPUT
                 SEQUENCE ',19,' IS
                 UNTRAINED, USE ESP')
               CALL SEARCH
                 (N,IX,M1,ID,W,L
                 EVEL,IDUM,IUNTRN)
               GO TO 803
      22       IF(ID(1,IDUM)EQ,IX(LEVEL))
                 GO TO 24

               IF(ID(2,IDUM),LE,IDUM) GO
                 TO 25
               IDUM= ID(2,IDUM)
               GO TO 22
      24       IF(LEVEL,EQ,N) GO TO 26
               IDUM = ID(3,IDUM)
               LEVEL = LEVEL +1
               GO TO 22
      25       K = ID(2,IDUM)
               IF(ESP) GO TO 6
               GO TO /
      6        WRITE(6,4) ICOUNT
               CALL SEARCH(N,IX,M1,IDW,
                 LEVEL,K,IUNTRN)
      7        IF(ESP) GO TO 803
      510      IUNTRN = ,TRUE,

C1             WRITE(6,27) ICOUNT
C2    27       FORMAT(5X,'INPUT
                 SEQUENCE ',19,' IS
                 UNTRAINED, RETURN TO
                 MAIN')
               GO TO 5
      26       A = ID(3,IDUM)
               W = A / RS
      803      CONTINUE
      5        RETURN
               END
END OF UNIVAC 1108 FORTRAN V
  COMPILATION, 0 *DIAGNOSTIC*
  MESSAGE(s)
```

Having described the invention in connection with certain specific embodiments thereof, it is to be understood that further modifications may now suggest themselves to those skilled in the art and it is intended to cover such modifications as fall within the scope of the appended claims.

What is claimed is:

1. An automatic trainable signal processing system where a plurality of input signals u and corresponding trained responses Z are employed as training signals which comprises:

a. means for quantizin samples of said signals *u* and Z;

b. a random access memory having storage locations for storing each different combination of the quantized values of said input training signals;

c. means to store said quantized values of said input training signals in said storage locations of said random access memory to establish with an entry node, families of retrievable trained responses Z for related combinations;

d. means for comparing the number of times each unique combination is encountered during storage;

e. means responsive to said comparing means for interchanging
i. the storage location of the response function for one of said combinations, and
ii. the storage location of the response function for any said combination whose response function is stored more remote from said entry node of the storage location of said random access memory and which combination is encountered more frequently than the combination whose response function is stored less remote from said entry node.

2. The combination set forth in claim 1 wherein means are provided for storing with each of said response functions
a. the address of the next node in the filial set of which the response function is a member, and
b. the address of the entry node of the next filial set in the storage locations of said random access memory.

3. The combination set forth in claim 1 wherein means are provided for storing as keys in the quantized values of said training signals as a chain in the storage locating of said random access memory response function along with
a. the address of the next node in the filial set to which the key belongs,
b. the address of the entry node of the next filial set in said tree, and
c. an indicia of the number of times said key has been addressed.

4. The combination set forth in claim 3 in which said interchange means includes selector means for interchange of a pair of keys, their addresses of the next nodes in the respective filial sets and their respective indicia.

5. The method of training an automatic trainable signal processing machine comprising the steps of
a. applying training signals to said automatic trainable signal processing machine, said training signals including at least one input signal along with a desired output signal Z;
b. quantizing said training signals;
c. in response to said training signals generating a distinctive response function for each new combination of values of said training signals;
d. storing said response functions in a tree storage array in a random access memory in said machine;
e. storing with each said response function indicia representative of the number of times the corresponding combination of training functions has been encountered, and
f. interchanging in a given filial set the storage locations of said response functions to maintain them in said set in descending order of said indicia.

6. The method of training an automatic trainable signal processing machine comprising the steps of
a. applying training signals to said automatic trainable signal processing machine, said training signals including at least one input signal along with a desired output signal Z;
b. quantizing said training signals;
c. in response to said training signals generating a distinctive response function for each new combination of values of said training signals;
d. storing in memory and in time sequence the training signals along with a trained response for combination of values of the input signals in a tree storage array having levels corresponding in number with the number of said input signals;
e. storing with each said value of the input signal
i. the address of the next node in the filial set of which the value is a member,
ii. the address of the entry node for the next filial set in said tree,
iii. the number of times said value has been addressed at the last node in said tree, and
iv. for each said combination of values storing a function representative of the trained response of said processor in dependence upon said combination of values and upon a desired processor output signal,
f. intermediate selected storing sequences, comparing the number of times a given value has been addressed with the number of times the value in its filial set next closest the entry node to said filial set has been addressed, and
g. in response to said comparison interchanging said values to maintain the values relative to the entry node in each said filial set in decreasing order of said number.

* * * * *